United States Patent [19]
Rehse et al.

[11] Patent Number: 5,754,270
[45] Date of Patent: May 19, 1998

[54] MULTIFOCAL LENS UTILIZING RAPID POWER SHIFT TRANSITION ZONE

[75] Inventors: Denis Rehse, St. Petersburg; Giovanna E. Olivares, Safety Harbor, both of Fla.

[73] Assignee: Unilens Corp., USA, Largo, Fla.

[21] Appl. No.: 746,391

[22] Filed: Nov. 8, 1996

[51] Int. Cl.$^6$ ................................................ G02C 7/04
[52] U.S. Cl. .............................................. 351/161
[58] Field of Search ................................... 351/161

[56] References Cited

U.S. PATENT DOCUMENTS 5,056,908 10/1991 Cohen ................................. 351/161
5,125,729  6/1992 Mercure ............................. 351/161
5,158,572 10/1992 Nielsen .............................. 351/161
5,225,858  7/1993 Portney ............................. 351/161
5,608,471  3/1997 Miller ............................... 351/161
5,650,837  7/1997 Roffman et al. .................... 351/161

*Primary Examiner*—Frank G. Font
*Assistant Examiner*—Jason D. Vierra-Eisenberg
*Attorney, Agent, or Firm*—Yahwak & Associates

[57] ABSTRACT

In accordance with the disclosure there is described herein a simultaneous vision lens that incorporates both continuous aspheric and concentric bifocal optics into a single optical lens that may be configured as a contact lens or an intraocular lens.

27 Claims, 6 Drawing Sheets

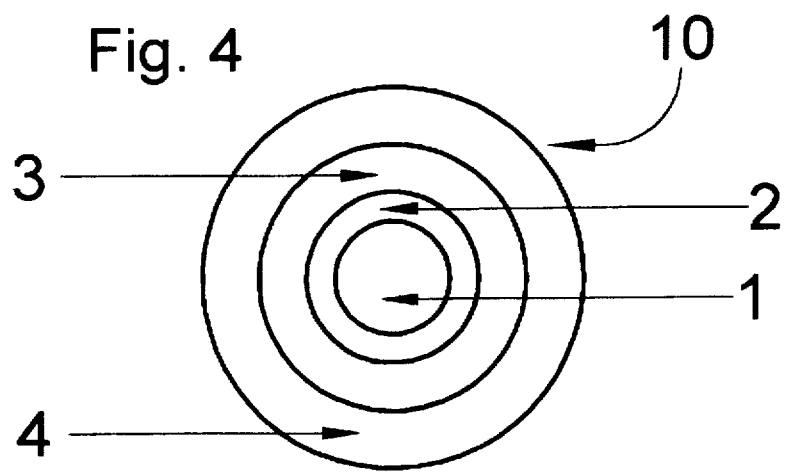
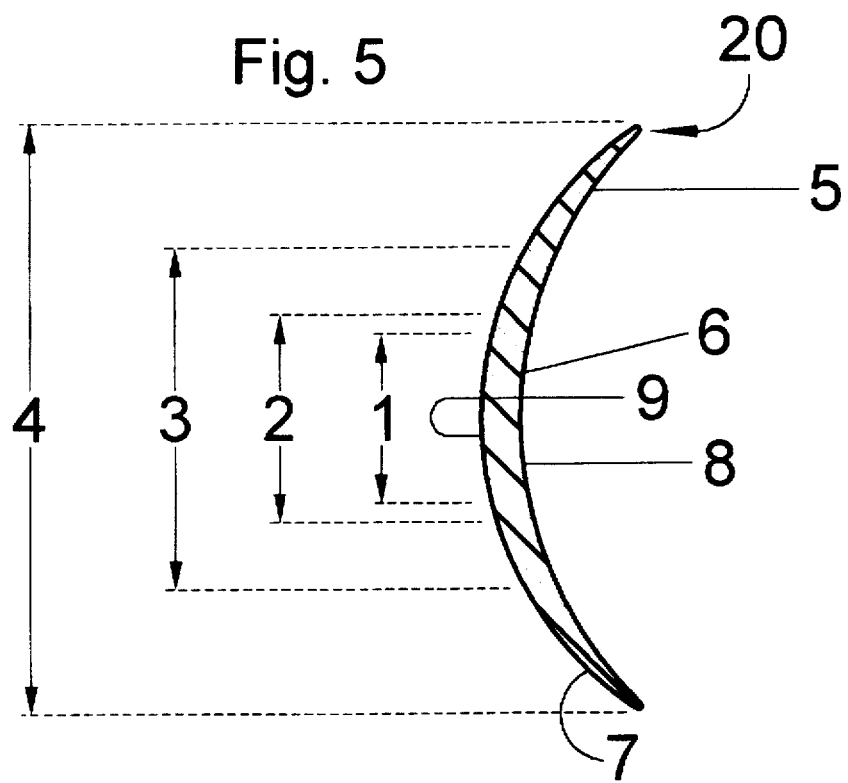

MULTIFOCAL LENS UTILIZING RAPID POWER SHIFT TRANSITION ZONE

BACKGROUND OF THE INVENTION

Numerous contact lens designs have been implemented to correct presbyopia. However, although a number of different designs are commercially available, each has its own benefits and limitations.

One type of design that has been implemented to correct presbyopia is the translating bifocal lens which has two distinct optic zones. Traditionally there is an upper for distance vision correction, and a lower for near vision correction. With such a lens, the distance portion of the lens is in front of the pupil of the eye in straight-ahead gaze, while in downward gaze, the add power or near portion of the lens is over the pupil. Correct alignment or orientation of the lens is controlled by a prism ballast, and the translation between optic zones is achieved by truncation of the bottom of the lens to rest against the bottom eye lid. The benefit of this design is clear distance vision and clear near vision with any add power because the patient will always be looking through a single power or optical zone, i.e., either the distance or near vision zone. Limitations to this design include corneal discomfort and problems caused by the extra thickness of the prism; lack of intermediate vision because such lenses are usually limited to bifocal optics; and difficulty in fitting due to the critical translation and alignment of the near segment over the pupil. i.e., proper fit is very patient dependent. An example of such a translating bifocal contact lens is described in U.S. Pat. No. 4,813,777.

Another design that has been implemented to correct presbyopia is the concentric bifocal contact lens. This is a simultaneous vision lens in which both near and distance power optics are present over the pupil at the same time. The benefits of this design are that it avoids the need for a prism ballast with all its associated problems, and it can be made with any desired add power. The limitations of this design include a lack of intermediate vision and a tendency to cause double imaging or 'ghosting' in both near and distance optic zones, in a significant number of presbyopic patients. This ghosting is thought to be caused by the zone of the bifocal contact lens that is out of focus while the other is in focus, superimposing the out of focus image on top of the in focus image. An example of such a concentric bifocal contact lens is described in U.S. Pat. No. 4,636,049; a bifocal intraocular lens with the same limitations is described in U.S. Pat. No. 4,636,211.

Still another design that has been implemented to correct presbyopia is the continuous asphere or multifocal lens which is a simultaneous vision lens design. The major benefit of this design is that the lens can be manufactured having a range of powers, i.e., it has the appropriate powers to focus at the distance and near and everywhere in between. Furthermore, because of the lack of two distinct optic zones, the problem with ghosting is minimized. The primary drawback with this design is that the lens is usually limited to near add powers of about 1.75 diopters or less. If this limit is exceeded, good vision at distance or near may be is compromised in many patients in that there is insufficient lens area of any particular power, i.e., an appropriately sized optic zone at any particular power, when the add power is too large. An example of such a continuous aspheric or multifocal lens is described in U.S. Pat. No. 4,199,231.

Accordingly, there is still a need to provide for a contact lens design that will be acceptable to the wearer suffering from presbyopia, and will lack may of the limitations of present-day translating bifocal, concentric bifocal, and continuous aspheric or multifocal contact lenses, or an intraocular lens that will lack the limitations of the concentric bifocal design.

SUMMARY OF THE INVENTION

It is an aspect of the present invention to provide for a optical lens that may be worn by patients with presbyopia.

It is also an aspect of the present invention to provide for a contact lens that provides for the appropriate near, intermediate and distance correction for patients with presbyopia, or an intraocular lens that can be implanted into the eye that will provide near, intermediate and distance vision correction.

It is also an aspect of the present invention to provide a description of an improved simultaneous contact lens that incorporates both continuous aspheric and concentric bifocal optics into a single contact lens.

BRIEF DESCRIPTION OF THE DRAWING

These and other aspects, features and advantages of the present invention will become more readily apparent from the following detailed description of the present invention taken with the accompanying drawings in which

FIG. 4 is a front plan view of a lens according to the present invention in which the each of the four concentric rings depicts a different optic zone;

FIG. 5 is a side cross-section planar view along the diameter of one embodiment of a contact lens according to the present invention;

DESCRIPTION OF THE PREFERRED EMBODIMENT(S)

Figure 1:
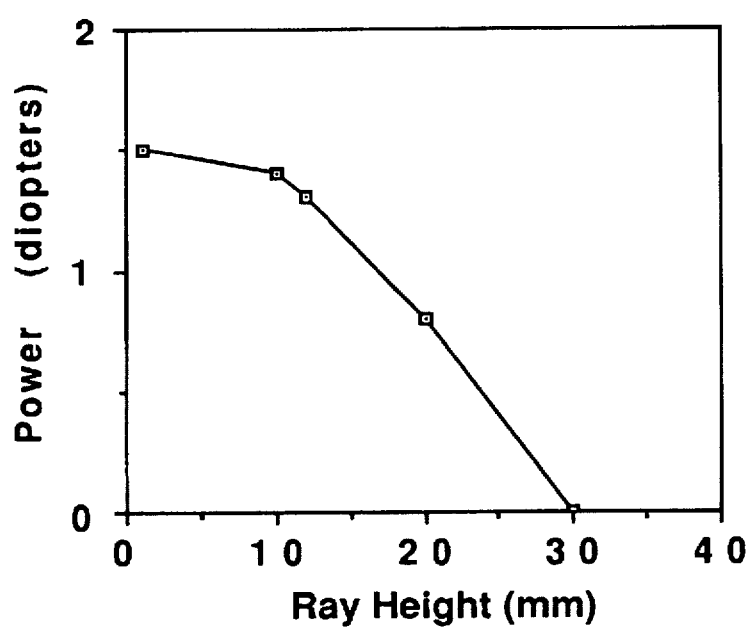
FIG. 1 is a graph depicting lens power measured in diopters versus distance from the center of the lens for a typical (U.S. Pat. No. 4,199,231) aspheric lens of the prior art with a distance correction of 0 diopters.
Figure 2:
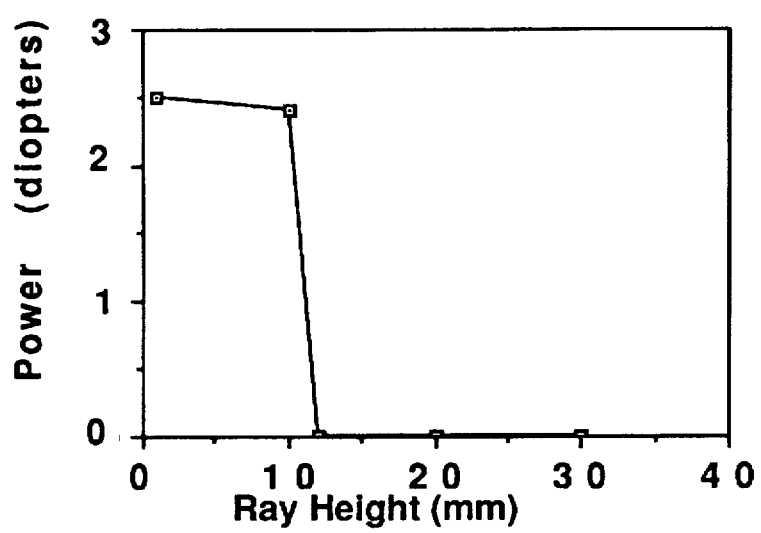
FIG. 2 is a graph depicting lens power measured in diopters versus distance from the center of the lens for a typical (U.S. Pat. No. 4,636,049) concentric bifocal lens of the prior art with a distance correction of 0 diopters.

In its broadest aspects, the present invention is directed to a multifocal optical lens, either a contact or intraocular lens, wherein the lens contains (i) a central optic zone having a first power correction range, (ii) at least one additional optic zone located peripheral of and concentric to said first zone (i.e., a "blending zone" or "transition zone") and having an additional power correcting range, and (iii) an optic zone located between each of the optic zones having power correcting ranges to provide a rapid power shift of about 0.5 to 1.25 diopters over a lens surface distance of about 0 to about 0.2 mm, i.e., the "optic zone distance". In addition, such multifocal lenses may be manufactured to include toric parameters for correction of astigmatism.

For uniformity in clearly understanding the present invention, the following terms are defined as:

(a) "Ray height" is the distance from the center of the lens that a particular ray of light strikes the front surface of the lens. This particular ray is then traced through the lens and where the ray crosses the center axis of the lens defines the focal length or power of the lens at that particular "ray height", assuming that the lens is symmetrical about the center axis;

(b) "Diopter" is a measurement of the power of the lens obtained by dividing 1 by the focal length of the lens in meters;

(c) "Add power range" or "APR" is the range of add powers included in a zone of the lens;

(d) "Depth of field" is a term used to describe the range of distances that an object may be observed and still appear to be in reasonable focus to the eye without the use of accommodation (the normal eye under normal room light conditions has a depth of field of approximately plus and minus 0.5 diopters from the ideal power correction for that distance);

(e) "Accommodation" is the ability of the eye to change focus;

(f) "Presbyopia" is a condition defined as the reduction or loss of accommodation;

(g) "Distance power" is the power correction required to bring distant objects into focus;

(h) "Add power" is the additional power over the distant power correction required to bring near objects into focus;

(i) "Base curve" is the back portion of a contact lens designed to fit over the cornea of the eye;

(j) "Posterior peripheral curve is the back portion of the contact lens designed to blend the base curve to the edge of the lens;

(k) "Anterior peripheral curve" is the front portion of the contact lens designed to blend the optic zones to the edge of the lens; and (l) "Residual accommodation" is that remaining ability to refocus the eye that a presbyope may still possess.

While the term "contact lens" is used throughout this description to describe the preferred embodiment of the present invention, it should be understood that this invention is also applicable to intraocular lenses, and thus the term "lens" when used alone should be considered in its broadest definition to include both contact and intraocular lenses.

Regarding the contact lens of the present invention, FIG. 4 depicts a planar frontal view of such a lens 10 having a central aspheric optic zone 1 symmetrical to the central axis of the lens 10 and having a diopter power equal to the distant power correction required to the lens plus an add power range of from 2.5 to 2.25 diopters from center outward. Optic zone 1 includes the center of the lens out to a ray height of from about 0.8 mm to about 1.6 mm. Outwardly and concentric with this first optic zone 1 there is an optic zone 2, i.e., a "blending zone", that provides a rapid power shift of about −0.5 to about −1.25 diopters over a small distance of about 0 to about 0.2 mm, or preferably about 0.05 mm. Outwardly from zone 2 there is a third optic zone 3 providing for the intermediate and distance correction required by the patient, and a fourth optic zone 4 that provides for the blending of the optic zones to the continued circular structure of the lens outward to its periphery.

As to diameter, zone 3 is typically about 8.0 mm, and zone 4 is about 14.5 mm. Of course, the sizes of each zone, which can be clearly seen in FIG. 5, may be altered by the manufacturer of the lens in order to provide a better fit to the needs of the patient. Although depicted as having sharp delineations between zones in FIG. 4, in actuality the demarcations between zones are continuous changes of power from one zone to another, i.e., the result of a continuous rather than discontinuous change in the power shift.

As depicted in FIG. 5, there is seen a planar cross-sectional view of the lens 20 according to the present invention having a rear surface 8 adapted to fit on the surface of the eye, and a front surface 9 which interacts with the rear surface to provide the desired optics of the lens. In addition lens 20 has a posterior peripheral curve 5, a base curve 6, and an anterior peripheral curve 7. In this figure the relative diameters of the four optic zones 1, 2, 3 and 4 are depicted by the distances between the phantom lines for each zone.

The following table, which describes specific ray heights and power shifts within the corresponding ranges encompassed by the present invention, is provided to provide a clearer understanding of the four zones

| ZONE | DIAMETER (mm) | APR (diopters) | RAY HEIGHT (mm) | POWER SHIFT (diopters) |
|---|---|---|---|---|
| 1 | 2.4 | 2.50 to 2.25 | 0.0 to 1.2 | 0.25 |
| 2 | 2.5 | 2.25 to 1.25 | 1.2 to 1.25 | 1.00 |
| 3 | 8.0 | 1.25 to 0.00 | 1.25 to 4.0 | 1.25 |
| 4 | 14.5 | no optics | 4.0 to 7.25 | no optics |

The power profile of a typical aspheric contact lens with 0 diopter distance correction is plotted in FIG. 1. While this provides good vision for many patients, it fails to provide the full power add correction required by most mature presbyopes for reading. Unfortunately, if the asphericity of the lens is increased to provide the full power add requirement to satisfy the needs of these patients, the quality of vision is usually compromised to an unacceptable degree because the lens area within the optic zone is spread out over a larger range of powers and thus giving less lens area at any particular power.

However, what has been discovered and described herein is that if a significant change in power occurs using little lens area, as shown by zone 2 in FIG. 4, then the incremental power shift can be made the same as in FIG. 1, except for the jump in power. The total presbyopic add requirement is achieved due to the aspheric power shift plus the jump or step in power. The quality of vision is maintained at both distance and near requirements due to having the same lens area per incremental power shift as FIG. 1 except for the powers included in zone 2 of FIG. 4. Surprisingly, with the lens as described in the present invention, there is no significant adverse effect on intermediate vision due to the jump power, i.e., optic zone 2 of FIG. 4, if it is placed and sized properly on the lens.

Figure 3:
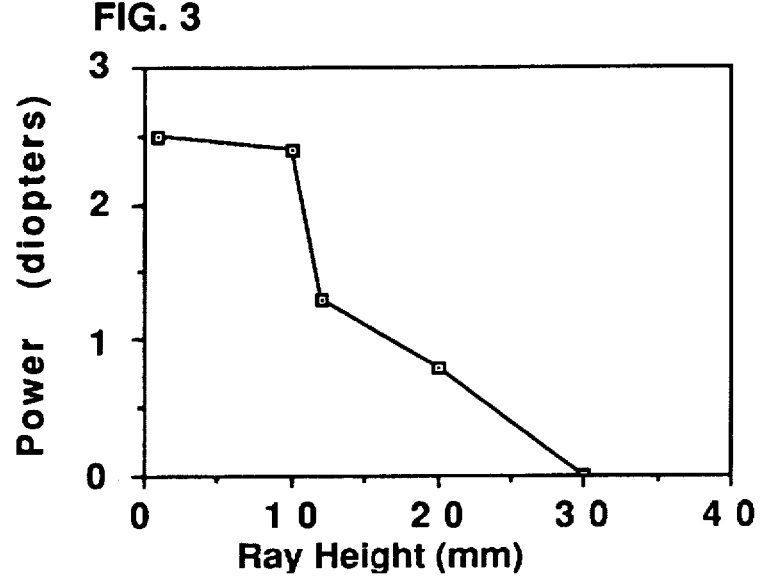
FIG. 3 is a graph depicting lens power measured in diopters versus distance from the center of the lens for a lens according to the present invention with a distance correction of 0 diopters.

This lack of an adverse effect by use of a contact lens according to the present invention upon the intermediate vision of a patient can best be explained by describing a typical patient. Assume that such a patient has good distance vision with a lens having a power profile as depicted in FIG. 1, but requires 2.5 diopters of add power (the effective add power requirement between distance and near vision is approximately 2.50 diopters in the average mature presbyopic patient) in order to have acceptable near vision to, for example, read properly. In such a patient, the center power of the lens would be increased by 1.0 diopter as depicted in FIG. 3, i.e., the lens in FIG. 1 would provide 1.5 diopters of the required 2.5 diopter requirement. To achieve this, the lens having the power profile of FIG. 3 is offset from the lens of FIG. 1 by 1.0 diopter from the lens center to a ray height of 1.2 mm. At this point, a power shift (optic zone 2) of −1.0 diopters starts and is completed by 1.25 mm, i.e., over a 0.05 mm distance. From this point to the edge of the lens, the power profiles for FIG. 1 and FIG. 3 are identical.

The basis for this can be explained by an examination of the optics of the lens that is the present invention. Since the focal length for distance vision is infinity, the diopter change required would be zero. That is:

diopter=1/focal length=1/∞=0

An additional 2.5 diopters would be 0.4 meters, i.e.,:

focal length=1/diopter=1/2.5=0.4 meters or 15.75 inches

Therefore, 15.75 inches would be the focal length for near or reading vision.

Comparing the requirements of the typical patient to the power profile of the lens according to the present invention, the add power requirement of the patient is 2.5 diopter. This requirement is satisfied by zone 1 of FIG. 4 which provides the add powers of from 2.5 diopter to 2.25 diopter. Zone 3 of FIG. 4 provides the add powers from 1.25 diopter to 0 diopter which fulfills the intermediate and distance power requirements of the patient. Between zones 1 and 3 of FIGS. 4 and 5 is optic zone 2 that contains the powers from 2.25 to 1.25 however, without sufficient lens area to be of any functional optical use to the patient, thereby leaving a 1.0 diopter gap in the patient's range of vision. However, if the depth of focus of the human eye is considered at half of the normally accepted value of + and −0.5 diopters to allow for adverse conditions, the gap of from 2.25 diopters to 1.25 diopters becomes a gap of from 2.0 diopters to 1.5 diopters. A focal length of 2.00 diopters is 0.5 meters (or 19.7 inches), and the focal length of 1.5 diopters is 0.67 meters (or 26.2 inches). The gap between these focal lengths is 0.17 meters (or 6.6 inches), and this small zone of 'just noticeable blur' has never been observed in patients within a clinical setting during the making and testing of the present invention because, it is believed, of a combination of residual accommodation and/or slight head movement. The result seen in clinical testing was continuous vision from distance to near and everything in between.

Figure 6:
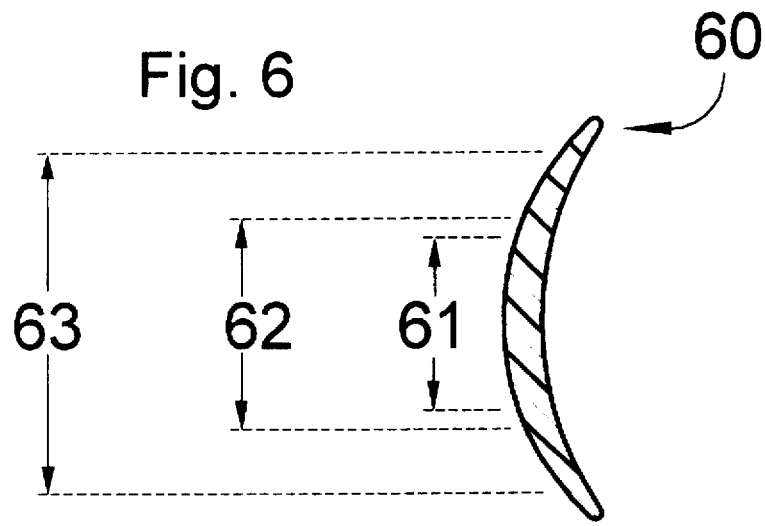
FIG. 6 is a side cross-section planar view along the diameter of another embodiment of a contact lens according to the present invention.

With regard to FIG. 6 there is shown an aspheric contact lens 60 similar in structure to that shown in FIG. 5. Lens 60 has a centrally located and generally circular first optic zone 61, a second optic zone 63 concentric with the first optic zone and located peripherally therefrom, and a third optic zone 62 located between said first and second optic zones and concentric with said first optic zone, said third optic zone providing a rapid power shift between the power correction of said first and second zones over a third optic zone distance of from 0 to 0.2 mm. As depicted, lens 60 may be manufactured in two configurations: (1) wherein the first optic zone 61 provides a range of power for correction of near vision, and the second optic zone 63 provides a range of power for correction of distance vision; and (2) wherein the first optic zone 61 provides a range of power for correction of distance vision, and the second optic zone 63 provides a range of power for correction of near vision.

Figure 7:
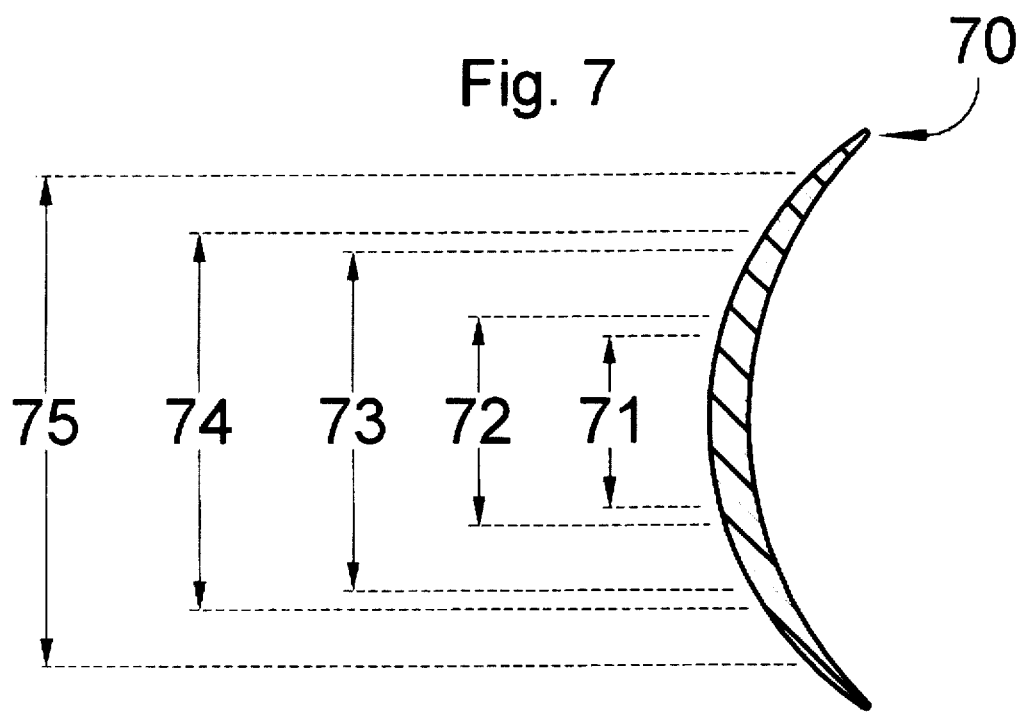
FIG. 7 is a side cross-section planar view along the diameter of still another embodiment of a contact lens according to the present invention.

With regard to FIG. 7 there is shown an aspheric contact lens 70 similar in structure to that shown in FIG. 5. Lens 70 has a centrally located and generally circular first optic zone 71; a second optic zone 73 concentric with the first optic zone and located peripherally therefrom; a third optic zone 75 concentric with said first optic zone located peripherally therefrom; a fourth 72 optic zone concentric with said first optic zone, located between said first 71 and second 73 optic zones, and peripherally therefrom, and providing a rapid power shift between the power correction of said first and second zones over a fourth optic zone distance of from 0 to 0.2 mm; and a fifth optic zone 74 concentric with said first optic zone, located between said second 73 and third 75 optic zones, and peripherally therefrom, and providing a rapid power shift between the power correction of said second and third zones over a fifth optic zone distance of from 0 to 0.2 mm. As depicted, lens 70 may be manufactured in two configurations: (1) wherein the first optic zone 71 provides a range of power for correction of near vision, the second optic zone 73 provides a range of power for correction of intermediate vision; the third optic zone 75 provides a range of power for correction of distance vision; and (2) wherein the first optic zone 71 provides a range of power for correction of distance vision, the second optic zone 73 provides a range of power for correction of intermediate vision; the third optic zone 75 provides a range of power for correction of near vision.

Figure 8:
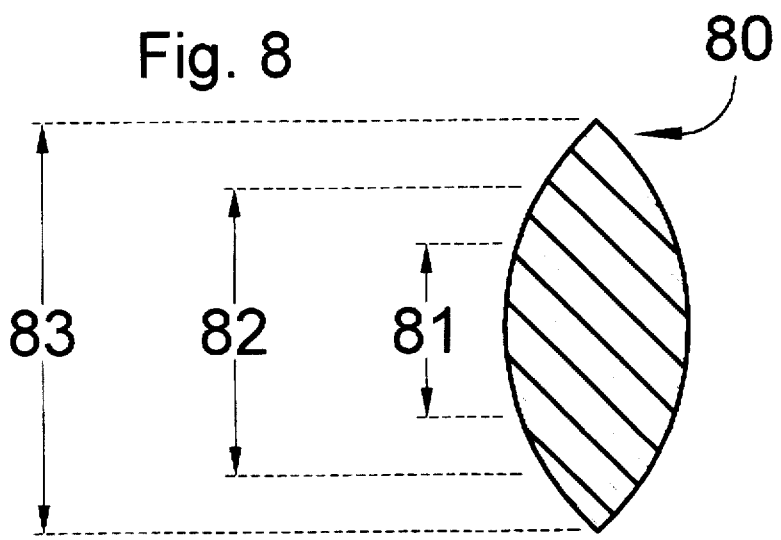
FIG. 8 is a side cross-section planar view along the diameter of an embodiment of an intraocular lens according to the present invention.

With regard to FIG. 8 there is shown an intraocular lens 80 according to the present invention. Lens 80 has a centrally located and generally circular first optic zone 81, a second optic zone 83 concentric with the first optic zone and located peripherally therefrom, and a third optic zone 82 located between said first and second optic zones and concentric with said first optic zone, said third optic zone providing a rapid power shift between the power correction of said first and second zones over a third optic zone distance of from 0 to 0.2 mm. As depicted, lens 80 may be manufactured in two configurations: (1) wherein the first optic zone 81 provides a range of power for correction of near vision, and the second optic zone 83 provides a range of power for correction of distance vision; and (2) wherein the first optic zone 81 provides a range of power for correction of distance vision, and the second optic zone 83 provides a range of power for correction of near vision.

Figure 9:
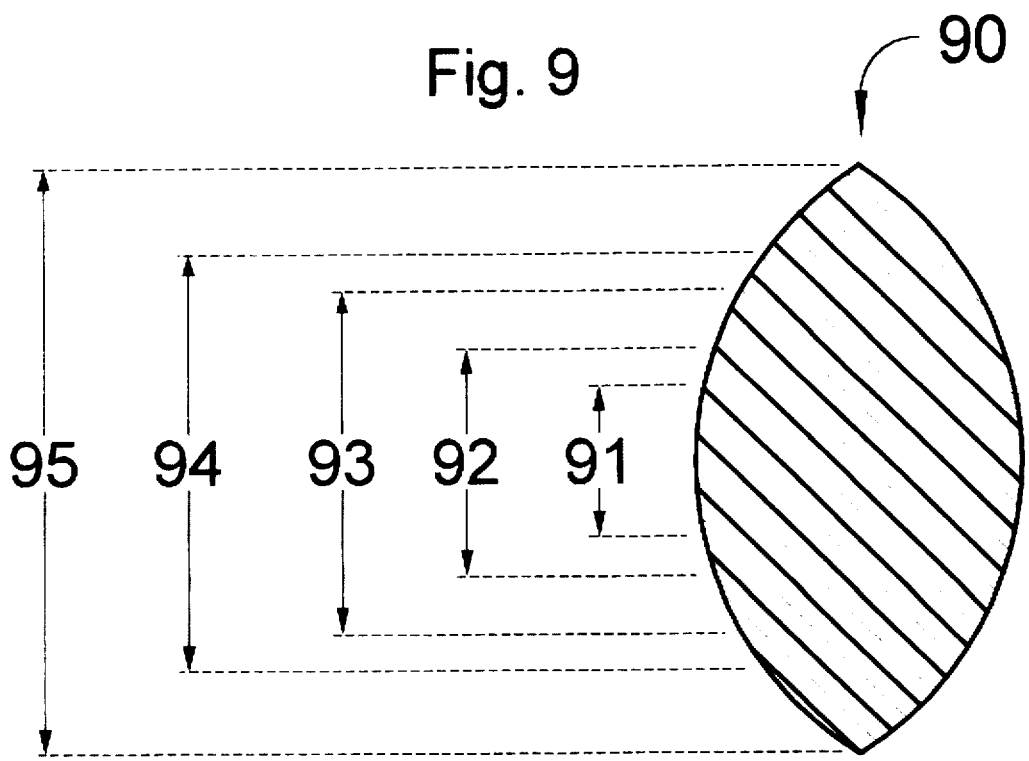
FIG. 9 is a side cross-section planar view along the diameter of another embodiment of an intraocular lens according to the present invention.

With regard to FIG. 9 there is shown an intraocular lens 90 according to the present invention. Lens 90 has a centrally located and generally circular first optic zone 91; a second optic zone 93 concentric with the first optic zone and located peripherally therefrom; a third optic zone 95 concentric with said first optic zone located peripherally therefrom; a fourth 92 optic zone concentric with said first optic zone, located between said first 91 and second 93 optic zones, and peripherally therefrom, and providing a rapid power shift between the power correction of said first and second zones over a fourth optic zone distance of from 0 to 0.2 mm; and a fifth optic zone 94 concentric with said first optic zone, located between said second 93 and third 95 optic zones, and peripherally therefrom, and providing a rapid power shift between the power correction of said second and third zones over a fifth optic zone distance of from 0 to 0.2 mm. As depicted, lens 90 may be manufactured in two configurations: (1) wherein the first optic zone 91 provides a range of power for correction of near vision, the second optic zone 93 provides a range of power for correction of intermediate vision; the third optic zone 95 provides a range of power for correction of distance vision; and (2) wherein the first optic zone 91 provides a range of power for correction of distance vision, the second optic zone 93 provides a range of power for correction of intermediate vision; the third optic zone 95 provides a range of power for correction of near vision.

It is to be understood that lenses, whether they are contact or intraocular, that are manufactured according to the present invention may also include a toric lens correction for a patient's astigmatism using conventional toric design parameters well known in the art of lens manufacture without departing from the scope of the invention. The lenses according to the present invention may be manufactured from conventional transparent hydrophilic plastic materials used to make 'soft' contact or intraocular lenses. Such lenses may be made with materials such as, for example, heflicon-A, polymacon, methafilcon, hydroxyethylmethacrylate, ethyleneglycoldimethacrylate, and polyvinylpyrrolidone. In addition, such lenses may be manufactured from the conventional transparent plastic materials used to make 'hard' contact or intraocular lenses. Such materials may be, for example, fluorosilicone acrylate or polymethylmethacrylate. In addition, lenses according to the present invention may be manufactured according to conventional lens manufacturing techniques including, for example, lathe cutting, injection molding, electroforming, and other techniques as are, for example, described in U.S. Pat. Nos. 4,434,581 and 4,460,275.

Thus while we have illustrated and described the preferred embodiment of my invention, it is to be understood that this invention is capable of variation and modification, and we therefore do not wish to be limited to the precise terms set forth, but desire to avail ourselves of such changes and alterations which may be made for adapting the invention to various usages and conditions. Accordingly, such variations and modifications are properly intended to be within the full range of equivalents, and therefore within the purview of the following claims.

Having thus described our invention and the manner and a process of making and using it in such full, clear, concise and exact terms so as to enable any person skilled in the art to which it pertains, or with which it is most nearly connected, to make and use the same;

We claim:

1. An aspheric multifocal contact lens for wearing by a patient with presbyopia comprising a lens body having a rear surface adapted to fit on the surface of the eye and a front surface that interacts with the rear surface to bring about the desired optics of said lens; said lens having a centrally located and generally circular first optic zone providing a first power correction for near vision, and a second optic zone concentric with the first optic zone and located peripherally therefrom providing a second power correction for distance vision; said improvement comprising a transition zone concentric with the first optic zone and located between said first and second optic zones, said transition zone providing a rapid power shift over a distance between the power correction of said first and second zones.

2. A lens according to claim 1 wherein the transition zone provides for a power shift of about −0.25 to about −1.5 diopters over a distance of about 0 to 0.2 mm.

3. A lens according to claim 2 wherein the distance is about 0.05 mm.

4. An aspheric multifocal contact lens for wearing by a patient with presbyopia comprising a lens body having a rear surface adapted to fit on the surface of the eye and having at least two concentric optic zones: a centrally located first optic zone having an add power range of from about 2.50 to 2.25 diopters; a second optic zone having an add power range of from about 1.25 to about 0.00; and a transition zone between said optic zones providing for a power shift over a distance of about 0 to about 0.2 mm and having an add power range of from about 2.25 to 1.25 diopters.

5. A lens according to 4 wherein the distance is about 0.05 mm.

6. An aspheric multifocal lens for use in correcting presbyopia in a patient which is generally circular in shape and comprises (i) a central optic zone having a first power correction range, (ii) at least one additional optic zone located peripheral of and concentric to said first zone and having an additional power correcting range, and (iii) a transition zone located between each of the optic zones having power correcting ranges to provide a rapid power shift of about 0.5 to 1.25 over a lens surface distance of about 0 to about 0.2 mm.

7. A lens according to claim 6 wherein the central optic zone has a power range for near vision correction.

8. A lens according to claim 7 which has one additional optic zone that has a power range for intermediate and distance vision correction.

9. A lens according to claim 8 which is a contact lens.

10. A lens according to claim 8 which is an intraocular lens.

11. A lens according to claim 6 wherein the lens contains two additional optic zones the first of which is located peripheral to said central optical zone, and the second of which is located peripheral to said first additional optic zone.

12. A lens according to claim 11 wherein the first additional optic zone has a power correction for intermediate vision correction.

13. A lens according to claim 12 wherein the central optic zone has a power range for near vision correction.

14. A lens according to claim 13 wherein the second optic zone has a power range for distance vision correction.

15. A lens according to claim 14 wherein the lens is an intraocular lens.

16. A lens according to claim 11 wherein the central zone has a power range for distance vision correction.

17. A lens according to claim 16 wherein the second additional optic zone has a power range for near vision correction.

18. A lens according to claim 17 wherein the lens is a contact lens.

19. An aspheric multifocal contact lens for wearing by a patient with presbyopia comprising a transparent lens body having a rear surface adapted to fit on the surface of the eye and a front surface which interacts with the rear surface to provide the desired optics; a centrally located and generally circular first optic zone providing a first range of power correction for near vision; a second optic zone concentric with the first optic zone and located peripherally therefrom and providing a second range of power correction for intermediate and distance vision; and a transition zone located between said first and second optic zones and providing a rapid power shift between the power correction of said first and second zones over a transition zone distance of from 0 to 0.2 mm.

20. An aspheric multifocal contact lens for wearing by a patient with presbyopia comprising a transparent lens body having a rear surface adapted to fit on the surface of the eye and a front surface which interacts with the rear surface to provide the desired optics; a centrally located and generally circular first optic zone providing a first range of power correction for near vision; a second optic zone concentric with the first optic zone and located peripherally therefrom and providing a second range of power correction for intermediate vision; and a third optic zone concentric with the second optic zone and located peripherally therefrom to provide a third range of power correction for distance vision; a first transition zone concentric with said first optic zone and providing a rapid power shift between the power correction of said first and second zones over a first transition zone distance of from 0 to 0.2 mm; and a second transition zone concentric with said second optic zone and located between said second and third optic zones and providing a rapid power shift between the power correction of said second and third zones over a second transition zone distance of from 0 to 0.2 mm.

21. An aspheric multifocal contact lens for wearing by a patient with presbyopia comprising a transparent lens body having a rear surface adapted to fit on the surface of the eye and a front surface which interacts with the rear surface to provide the desired optics; a centrally located and generally circular first optic zone providing a first range of power correction for distance and intermediate vision; a second optic zone located peripheral to and concentric with the first optic zone and providing a second range of power correction for near vision; and a transition zone concentric with the first optic zone and located between said first and second optic zones and providing a rapid power shift between the power correction of said second and third zones over a transition zone distance of from 0 to 0.2 mm.

22. An aspheric multifocal contact lens for wearing by a patient with presbyopia comprising a transparent lens body having a rear surface adapted to fit on the surface of the eye and a front surface which interacts with the rear surface to provide the desired optics; a centrally located and generally circular first optic zone providing a first range of power correction for distance vision; a second optic zone concentric with the first optic zone and located peripherally therefrom providing a second range of power correction for intermediate vision; a third optic zone concentric with the second optic zone and located peripherally therefrom providing a third range of power correction for near vision; a first transition zone located between said first and second optic zones providing a rapid power shift between the power correction of said first and second zones over a first transition zone distance of from 0 to 0.2 mm; and a second transition zone located between said second and third optic zones providing a rapid power shift between the power correction of said second and third zones over a second transition zone distance of from 0 to 0.2 mm.

23. An aspheric multifocal intraocular lens for implanting into the eye of a patient with presbyopia comprising a transparent lens body, said body having a centrally located and generally circular first optic zone providing a first range of power correction for near vision; a second optic zone concentric with the first optic zone and located peripherally therefrom and providing a second range of power correction for intermediate and distance vision; and a transition zone located between said first and second optic zones and providing a rapid power shift between the power correction of said first and second zones over a transition zone distance of from 0 to 0.2 mm.

24. An aspheric multifocal intraocular lens for implanting into the eye of a patient with presbyopia comprising a transparent lens body, said body having a centrally located and generally circular first optic zone providing a first range of power correction for near vision; a second optic zone concentric with the first optic zone and located peripherally therefrom and providing a second range of power correction for intermediate vision; and a third optic zone concentric with the second optic zone and located peripherally therefrom to provide a third range of power correction for distance vision; a first transition zone concentric with said first optic zone and providing a rapid power shift between the power correction of said first and second zones over a first transition zone distance of from 0 to 0.2 mm; and a second transition zone concentric with said second optic zone and located between said second and third optic zones and providing a rapid power shift between the power correction of said second and third zones over a second transition zone distance of from 0 to 0.2 mm.

25. An aspheric multifocal intraocular lens for implanting into the eye of a patient with presbyopia comprising a transparent lens body, said body having a centrally located and generally circular first optic zone providing a first range of power correction for distance and intermediate vision; a second optic zone located peripheral to and concentric with the first optic zone and providing a second range of power correction for near vision; and a transition zone concentric with the first optic zone and located between said first and second optic zones and providing a rapid power shift between the power correction of said second and third zones over a transition zone distance of from 0 to 0.2 mm.

26. An aspheric multifocal intraocular lens for implanting into the eye of a patient with presbyopia comprising a transparent lens body, said body having a centrally located and generally circular first optic zone to provide a centrally located and generally circular first optic zone providing a first range of power correction for distance vision; a second optic zone concentric with the first optic zone and located peripherally therefrom providing a second range of power correction for intermediate vision; a third optic zone concentric with the second optic zone and located peripherally therefrom providing a third range of power correction for near vision; a first transition zone located between said first and second optic zones providing a rapid power shift between the power correction of said first and second zones over a first transition zone distance of from 0 to 0.2 mm; and a second transition zone located between said second and third optic zones providing a rapid power shift between the power correction of said second and third zones over a second transition zone distance of from 0 to 0.2 mm.

27. A multifocal lens according to anyone of claims 1, 4, 6, 19, 20, 21, 22, 23, 24, 25 or 26 which includes a toric lens correction for a patient's astigmatism.

* * * * *